(12) United States Patent
Sawayama et al.

(10) Patent No.: US 9,236,603 B2
(45) Date of Patent: Jan. 12, 2016

(54) CARBON MATERIAL FOR LITHIUM ION SECONDARY CELL, NEGATIVE ELECTRODE MATERIAL FOR LITHIUM ION SECONDARY CELL AND LITHIUM ION SECONDARY CELL

(75) Inventors: Yosuke Sawayama, Tokyo (JP); Shinpei Sakasita, Tokyo (JP); Tatsuro Sasaki, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 13/502,401

(22) PCT Filed: Oct. 19, 2010

(86) PCT No.: PCT/JP2010/006183
§ 371 (c)(1),
(2), (4) Date: Apr. 17, 2012

(87) PCT Pub. No.: WO2011/064936
PCT Pub. Date: Jun. 3, 2011

(65) Prior Publication Data
US 2012/0208089 A1   Aug. 16, 2012

(30) Foreign Application Priority Data

Nov. 25, 2009 (JP) ................. 2009-267807

(51) Int. Cl.
*H01M 4/583* (2010.01)
*H01M 10/0525* (2010.01)
(Continued)

(52) U.S. Cl.
CPC .............. *H01M 4/133* (2013.01); *C01B 31/02* (2013.01); *H01M 4/587* (2013.01); *H01M 10/0525* (2013.01); *H01M 2004/021* (2013.01); *Y02E 60/122* (2013.01)

(58) Field of Classification Search
USPC ............................. 429/231.7–231.8
See application file for complete search history.

(56) References Cited

U.S. PATENT DOCUMENTS 3,755,193 A * 8/1973 Luft et al. ............... 502/101
4,702,977 A * 10/1987 Hiratsuka et al. ........ 429/218.1
(Continued)

FOREIGN PATENT DOCUMENTS

JP     11-354120      * 12/1999
JP     2001-102046 A    4/2001
(Continued)

OTHER PUBLICATIONS

J. Dryzek et al.: Positron Annihilation in Crabon Fibers, phys. stat. sol. (a) 151, 39 (1995).*

(Continued)

*Primary Examiner* — Ula C Ruddock
*Assistant Examiner* — Osei Amponsah
(74) *Attorney, Agent, or Firm* — Westerman, Hattori, Daniels & Adrian, LLP

(57) ABSTRACT

Disclosed is a carbon material for lithium ion secondary cell having a positron lifetime of 370 picoseconds or longer, and 480 picoseconds or shorter, when measured by positron annihilation spectroscopy under conditions (A) to (E) below:
(A) positron radiation source: positrons generated from electron-positron pairs using an electron accelerator;
(B) gamma ray detector: a $BaF_2$ scintillator and a photoelectron multiplier;
(C) measurement temperature and atmosphere: 25° C., in vacuum;
(D) annihilation γ-ray counts: $3 \times 10^6$ or larger; and
(E) positron beam energy: 10 keV.

5 Claims, 2 Drawing Sheets

(51) Int. Cl.
*C01B 31/00* (2006.01)
*H01M 4/133* (2010.01)
*C01B 31/02* (2006.01)
*H01M 4/587* (2010.01)
*H01M 4/02* (2006.01)

(56) References Cited

U.S. PATENT DOCUMENTS 5,326,658 A * 7/1994 Takahashi et al. ......... 429/231.8
2005/0277026 A1 * 12/2005 Nishikawa et al. ........... 429/249

FOREIGN PATENT DOCUMENTS

| JP | 2004-182507 | A | | 7/2004 |
| JP | 2004-303428 | A | | 10/2004 |
| JP | 2006-083012 | A | | 3/2006 |
| JP | 2008-010224 | A | | 1/2008 |
| JP | 2009-200014 | A | * | 9/2009 |

OTHER PUBLICATIONS

International Search Report for PCT/JP2010/006183, dated Jan. 25, 2011.

* cited by examiner

CARBON MATERIAL FOR LITHIUM ION SECONDARY CELL, NEGATIVE ELECTRODE MATERIAL FOR LITHIUM ION SECONDARY CELL AND LITHIUM ION SECONDARY CELL

TECHNICAL FIELD

The present invention relates to a carbon material for lithium ion secondary cell, a negative electrode material for lithium ion secondary cell, and a lithium ion secondary cell.

BACKGROUND ART

Carbon material has been used for negative electrode of lithium ion secondary cell, since the negative electrode composed of the carbon material is less likely to allow dendritic lithium to deposit thereon even after repetitive charge-discharge cycles, and safety may therefore be ensured.

For example, Patent Document 1 discloses a carbon material having a nitrogen content of 0.1 to 5% by weight, and a volume of pores, occupied by those having a pore size exceeding 0.33 nm, of 0.1 to 50 ml/kg.

Patent Document 2 discloses a carbon material obtained by carburizing a specific resin composition, and having a pore volume of 50 ml/kg or smaller.

PATENT DOCUMENT

Patent Document 1: Japanese Laid-Open Patent Publication No. 2006-083012
Patent Document 2: Japanese Laid-Open Patent Publication No. 2004-303428

DISCLOSURE OF THE INVENTION

In recent years, there have been demands for development of lithium ion batteries having larger charging capacity and larger discharged capacity. It is, however, difficult for the batteries making use of the conventional carbon materials disclosed in Patent Documents 1 and 2, to satisfy the demands. The conventional carbon materials disclosed in Patent Documents 1 and 2 were focused on the pores into which gas may intrude from the surface thereof, and aimed at improving charge/discharge efficiency typically by suppressing surface reaction, but has not yet been successful to develop a carbon material also improved in the charge/discharged capacity.

According to the present invention, there is provided a carbon material for lithium ion secondary cell having a positron lifetime of 370 picoseconds or longer and 480 picoseconds or shorter, when measured by positron annihilation spectroscopy under conditions (A) to (E) below:

(A) positron radiation source: positrons generated from electron-positron pairs using an electron accelerator;
(B) gamma ray detector: a $BaF_2$ scintillator and a photoelectron multiplier;
(C) measurement temperature and atmosphere: 25° C., in vacuum;
(D) annihilation γ-ray counts: $3 \times 10^6$ or larger; and
(E) positron beam energy: 10 keV.

By using the carbon material for lithium ion secondary cell, a lithium ion battery having large charging capacity, large discharged capacity, and charge/discharge efficiency of a certain level or above, may be provided. In other words, according to the present invention, a lithium ion battery well balanced among charging capacity, discharged capacity and charge/discharge efficiency may be provided.

According to the present invention, there is also provided a negative electrode material for lithium ion secondary cell containing the above-described carbon material for lithium ion secondary cell, and a lithium ion secondary cell containing the negative electrode material for lithium ion secondary cell.

According to the present invention, a carbon material for lithium ion secondary cell and a negative electrode material for lithium ion secondary cell, capable of providing a lithium ion battery having large charging capacity, large discharged capacity, and being well balanced among the charging capacity, the discharged capacity and the charge/discharge efficiency, and such lithium ion secondary cell may be provided.

DESCRIPTION OF THE EMBODIMENTS

Figure 1:
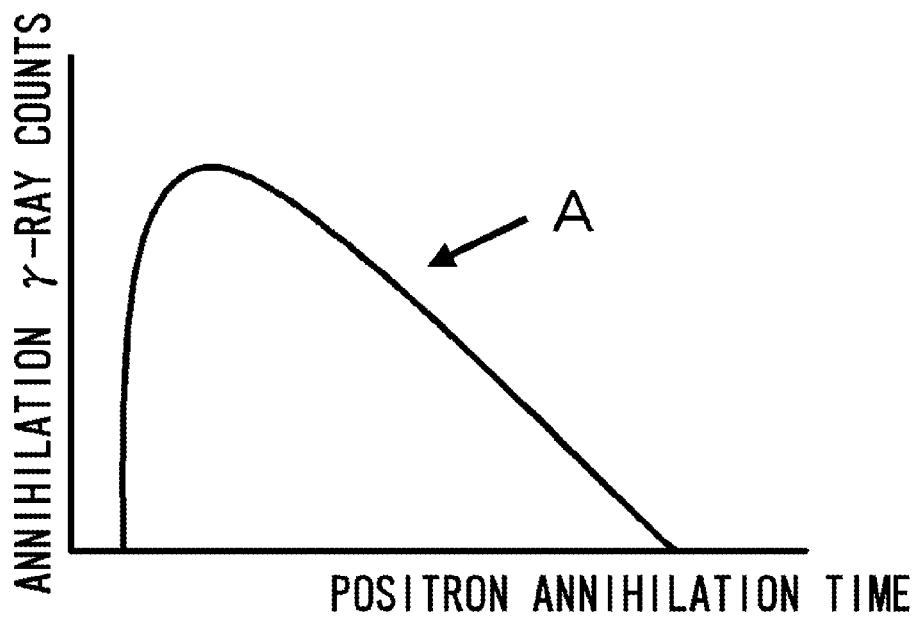
FIG. 1 is a drawing illustrating a relation between annihilation γ-ray counts and positron annihilation time.

Embodiments of the present invention will be explained below, referring to the attached drawings.
(Carbon Material for Lithium Ion Secondary Cell)
To begin with, the carbon material for lithium ion secondary cell (occasionally be referred to as "carbon material", hereinafter) of the present invention will be outlined.

The carbon material for lithium ion secondary cell of the invention has a positron lifetime of 370 picoseconds or longer and 480 picoseconds or shorter, when measured by positron annihilation spectroscopy under conditions (A) to (E) below:

(A) positron radiation source: positrons generated from electron-positron pairs using an electron accelerator;
(B) gamma ray detector: a $BaF_2$ scintillator and a photoelectron multiplier;
(C) measurement temperature and atmosphere: 25° C., in vacuum;
(D) annihilation γ-ray counts: $3 \times 10^6$ or larger; and
(E) positron beam energy: 10 keV.

Next, the carbon material for lithium ion secondary cell will be detailed.

While source materials or precursors used for the carbon material for lithium ion secondary cell are not specifically limited, preferable examples include petroleum-derived or coal-derived tar and pitch, such as petroleum-derived tar and pitch by-produced in the process of manufacturing ethylene, coal tar produced in the process of dry distillation of coal, heavy ends and pitch remained after distillative removal of low-boiling components, tar and pitch obtained by liquefaction of coal; crosslinked products of these tar and pitch; and carburized products of resins, including thermosetting resin and thermoplastic resin, or resin composition. Particularly preferable examples of the resin and resin composition will be described later. Note that, in the present invention, also the tar and pitch derived from petroleum, coal and so forth, and crosslinked products thereof are embraced in the resin in a broad sense, and they may be used alone or in combination of two or more species.

As described later, the resin composition may additionally contain curing agent, additives and so forth, besides the above-described resin as the major constituent.

The description below will be given referring to exemplary cases where resin, resin composition or pitch was used as a source material of the carbon material for lithium ion secondary cell.

Thermosetting resin or thermoplastic resin may be contained as the resin, or as the resin in the resin composition, but not specifically limited thereto. The resin may be used alone, or in combination of two or more species.

As described later, the resin composition may additionally contain curing agent, additives and so forth, besides the above-described resin as the major constituent.

The thermosetting resin herein is not specifically limited, and examples of which include phenol resin such as novolac-type phenol resin and resol-type phenol resin, epoxy resin such as bisphenol-type epoxy resin and novolac-type epoxy resin, melamine resin, urea resin, aniline resin, cyanate resin, furan resin, ketone resin, unsaturated polyester resin, and urethane resin. Also modified products of these materials modified by various components may be adoptable.

The thermoplastic resin herein is not specifically limited, and examples of which include polyethylene, polystyrene, polyacrylonitrile, acrylonitrile-styrene (AS) resin, acrylonitrile-butadiene-styrene (ABS) resin, polypropylene, vinyl chloride, methacryl resin, polyethylene terephthalate, polyamide, polycarbonate, polyacetal, polyphenylene ether, polybutylene terephthalate, polyphenylene sulfide, polysulfone, polyether sulfone, polyether ether ketone, polyetherimide, polyamide-imide, polyimide, and polyphthalamide.

The thermosetting resin is preferable as the resin which composes the major constituent of the carbon material of the present invention. This consequently raises the actual carbon.

Among the thermosetting resin, those selected from novolac-type phenol resin, resol-type phenol resin, melamine resin, furan resin, aniline resin, and modified products of these resins are preferable. This consequently expands the degree of freedom in design of the carbon material, and enables manufacturing at low costs.

When the thermosetting resin is used, a curing agent therefor may be used together.

The curing agent adoptable herein is not specifically limited, wherein examples of which, to be combined with the novolac-type phenol resin, include hexamethylenetetramine, resol-type phenol resin, polyacetal, and paraformaldehyde. On the other hand, examples of the curing agent to be the combined with epoxy resin include polyamine compound such as aliphatic polyamine and aromatic polyamine, acid anhydride, imidazole compound, dicyandiamide, novolac-type phenol resin, bisphenol-type phenol resin, and resol-type phenol resin, all of which being well known as the curing agent for epoxy resin.

Note that, in the resin composition used in the present invention, the thermosetting resin, which generally requires a predetermined amount of curing agent, may be used with a less amount of curing agent than in the usual use, or without the curing agent.

The resin composition used in the present invention may additionally be added with an additive.

The additive adoptable herein is not specifically limited, and examples of which include carbon material precursor carburized at 200 to 800° C., graphite and graphite modifier, organic acid, inorganic acid, nitrogen-containing compound, oxygen-containing compound, aromatic compound, and non-iron metal element. The additive may be used alone, or in combination of two or more species, depending on the species and properties of resin to be adopted.

The resin used for the carbon material of the present invention may contain, as the major constituent, a nitrogen-containing resin described later. For the case where the resin does not contain the nitrogen-containing resin as the major constituent, it may contain at least one species or more of nitrogen-containing compound as a component other than the major constituent resin; or may contain the nitrogen-containing resin as the major constituent, and also contain a nitrogen-containing compound as a constituent other than the major constituent resin. By carburizing these sorts of resin, the nitrogen-containing carbon material may be obtained.

The nitrogen-containing resin are exemplified as follows.

Examples of the thermosetting resin include melamine resin, urea resin, aniline resin, cyanate resin, and urethane resin, and include also phenol resin and epoxy resin modified by a nitrogen-containing component such as amine.

Examples of the thermoplastic resin include polyacrylonitrile, acrylonitrile-styrene (AS) resin, acrylonitrile-butadiene-styrene (ABS) resin, polyamide, polyether imide, polyamide imide, polyimide, and polyphthalamide.

Resins other than the nitrogen-containing resin are exemplified as follows.

Examples of the thermosetting resin include phenol resin, epoxy resin, furan resin, and unsaturated polyester resin.

Examples of the thermoplastic resin include polyethylene, polystyrene, polypropylene, vinyl chloride, methacryl resin, poly ethylene terephthalate, polycarbonate, polyacetal, polyphenylene ether, polybutylene terephthalate, polyphenylene sulfide, polysulfone, polyethersulfone, and polyether ether ketone.

While species of the nitrogen-containing compound, used as the component other than the major constituent resin, is not specifically limited, examples of which include hexamethylenetetramine known as a curing agent for novolac-type phenol resin; and aliphatic polyamine, aromatic polyamine and dicyandiamide known as curing agents for epoxy resin. Besides the curing agent components, the nitrogen-containing compounds adoptable herein also include amine compound, ammonium salt, nitrate and nitro compound which do not function as the curing agent.

The nitrogen-containing compounds may be used alone, or in combination of two or more species, irrespective of whether they contain the nitrogen-containing resin as the major constituent resin or not.

Examples of the pitch include coal tar pitch, petroleum pitch, organo-synthetic pitch obtained by polycondensation of condensed polycyclic aromatic hydrocarbon compound, and organo-synthetic pitch obtained by polycondensation of hetero-atom-containing condensed polycyclic aromatic hydrocarbon compound. Also modified compounds obtained by modifying them with various components may be adoptable.

Nitrogen content of the resin composition, resin or pitch used for the carbon material of the present invention is preferably 5 to 65% by weight, although not specifically limited. The nitrogen content is more preferably 10 to 20% by weight.

The carbon material, finally obtained by carburizing this sort of resin composition, resin or pitch, preferably has a carbon atom content of 95 wt % or more and a nitrogen atom content of 0.5 to 5 wt %.

By adjusting the nitrogen atom content to 0.5 wt % or more, and particularly to 1.0 wt % or more, the carbon material may be given with a desirable electrical characteristic by virtue of electronegativity intrinsic to nitrogen. In this way, the carbon material allows accelerated intercalation and de-intercalation of lithium ion, and is thereby given with excellent charge/discharge characteristics.

In addition, by adjusting the nitrogen atom content to 5 wt % or less, and in particular to 3 wt % or less, the carbon material may be suppressed from being excessively enhanced in the electrical characteristics, and thereby the intercalated lithium ion may be prevented from being electrically adsorbed to nitrogen atom. In this way, excellent charge/discharge characteristics may be obtained while suppressing increase in the irreversible capacity.

The nitrogen content in the carbon material of the present invention is adjustable by appropriately setting the resin composition, the nitrogen content in the resin or pitch, conditions of carburization thereof, and additionally based on conditions of curing or pre-carburization if the carburization is preceded by these processes.

For example, a typical method of obtaining the carbon material having the nitrogen content described in the above is such that the nitrogen content in the resin composition, resin, or pitch is adjusted to a predetermined value, and the conditions of carburization, in particular the final temperature, is appropriately adjusted.

Methods of preparing the resin composition used for the carbon material of the present invention are not specifically limited, and examples of which include a method of mixing the major constituent resin and other components according to a predetermined ratio, and mixing them under fusion, a method of mixing these components by dissolving them in a solvent, and a method of mixing these components by crushing.

The nitrogen content in the carbon material is obtained by a method of measuring thermal conductivity.

In the method, a sample to be measured is converted by combustion into simple gases ($CO_2$, $H_2O$, and $N_2$), the gasified sample is homogenized, and allowed to pass through a column. In this way, the individual gases are stepwise separated, wherein the individual contents of carbon, hydrogen and nitrogen may be determined based on the individual values of thermal conductivity.

In the present invention, the measurement was conducted using an elemental analyzer "PE2400" from PerkinElmer Inc.

The carbon material of the present invention has a positron lifetime of 370 picoseconds or longer, and preferably 380 picoseconds or longer, when measured by positron annihilation spectroscopy under conditions. The carbon material of the present invention has a positron lifetime of 480 picoseconds or shorter, and preferably 460 picoseconds or shorter, when measured by positron annihilation spectroscopy.

If the positron lifetime measured by the positron annihilation spectroscopy is 370 picoseconds or longer and 480 picoseconds or shorter, the carbon material may be increased in the charging capacity and the discharged capacity, despite formation therein of voids having a size allowing smooth intercalation and de-intercalation of lithium, and thereby, a carbon material having large charging capacity, large discharged capacity, and charge/discharge efficiency of a certain level or above, that is, a carbon material well balanced among the charging capacity, discharged capacity and charge/discharge efficiency, may be obtained.

Now, relation between the positron lifetime and the size of void will be explained.

The positron annihilation spectroscopy is a method of measuring the size of void, by measuring time over which a positron ($e^+$) enters the sample and annihilate.

Positron is an antimatter of electron, and has the same rest mass with electron but has positive charge.

When injected into a substance, a positron is known to form a pair with an electron (positron-electron pair (positronium)), and then to annihilate. When a positron is bombarded into the carbon material, the positron ($e^+$) binds with one of electrons knocked out in the polymer, to form a positronium. The positronium is trapped in a portion in the polymer material where electron density is low, that is, in a local void in the polymer, and annihilates as a result of overlapping with electron cloud which extends out from the wall of the void. When the positronium resides in the void of the polymer, size of the void and annihilation lifetime of the positronium are in reverse proportion. More specifically, a small void will give a large overlapping between the positronium and peripheral electron, and will give a short positron annihilation lifetime. On the other hand, a large void will reduce probability of annihilation of the positronium by overlapping with other electron leached out from the wall of the void, and thereby the annihilation lifetime of positronium will grow longer. Accordingly, the size of void in the carbon material may be evaluated by measuring the annihilation lifetime of positronium.

As described in the above, a positron incident into the carbon material loses its energy, and forms a positronium together with an electron, and then annihilates. In this process, γ ray is emitted from the carbon material.

Emission of γ ray is, therefore, understood as a signal of the end of measurement.

As a positron radiation source for the measurement of positron annihilation lifetime, an electron accelerator is widely used, and also radioisotope $^{22}$Na is used as a universal source. $^{22}$Na concomitantly emits positron and γ ray of 1.28 MeV, upon $β^+$ decay into $^{22}$Ne. A positron incident in the carbon material emits γ ray of 511 keV as a result of annihilation. Accordingly, the annihilation lifetime of positron may be determined by measuring time interval between emission of 1.28-MeV γ ray, used as a start signal, and a 511-keV γ ray, used as an end signal. More specifically, a positron lifetime spectrum illustrated in FIG. 1 may be obtained. Slope "A" of the positron lifetime spectrum represents the positron lifetime, so that the positron lifetime of the carbon material may be understood from the positron lifetime spectrum.

On the other hand, for the case where the electron accelerator is used as the positron radiation source, positrons are generated by inducing generation of electron-positron pairs by bremsstrahlung X ray which is generated by irradiating a target composed of tantalum or tungsten with electron beam. When the electron accelerator is used, a point of time when positron beam is incident on a sample is assumed as the start of measurement (which corresponds to the start signal for the case of using $^{22}$Na), while assuming the end signal similarly to the case of using $^{22}$Na.

Conventional efforts of development have been directed to obtain the carbon material having pores, the size and capacity of which being suitable to allow lithium to intercalate thereinto and de-intercalate therefrom, by measuring pore capacity or pore size based on the gas adsorption method using $CO_2$, typically as disclosed in Patent Documents 1 and 2. It has, however, been very difficult to improve the charging capacity and the discharged capacity, even if the carbon material having pores which satisfy the conditions disclosed in Patent Documents 1 and 2 was used.

This is supposedly because a carbon dioxide molecule has a diameter of 0.33 nm, and is much larger than lithium ion (ion diameter of which is approximately 0.06 nm). Since lithium ion can go into, or come out from very small pores which are not detectable by the gas adsorption method using carbon dioxide, so that it is difficult for the gas adsorption method using $CO_2$ to precisely estimate the pores allowing intercalation and de-intercalation of lithium ion. This possibly why it has been impossible to obtain the carbon material having optimum pores allowing intercalation and de-intercalation of lithium ion.

In contrast, since positron used in the positron annihilation spectroscopy is very small, pores optimum for intercalation and de-intercalation of lithium ion may be estimated in a precise manner. Accordingly, the charging capacity and the discharged capacity may successfully be improved, by manufacturing the carbon material having a positron lifetime of 370 picoseconds or longer and 480 picoseconds or shorter, when measured by the positron annihilation spectroscopy, and by using the carbon material.

If the positron lifetime measured by the positron annihilation spectroscopy is shorter than 370 picoseconds, the pores are too small and therefore allow intercalation and de-intercalation of lithium ion only with difficulty. On the other hand, if the positron lifetime measured by the positron annihilation spectroscopy exceeds 480 picoseconds, amount of intercalation of lithium might increase, but lithium may be less likely to de-intercalate, due to increase in the electrostatic capacity ascribable to intercalation of other substances including the electrolytic solution.

The carbon material of the present invention preferably has an average interplanar spacing d of the (002) planes, observed by wide angle X-ray diffractometry and calculated using Bragg's equation, of 3.4 Å or larger, and 3.9 Å or smaller. If the average interplanar spacing d002 is 3.4 Å or larger, and particularly 3.6 Å or larger, the interlayer will be less likely to shrink or swell in association with intercalation of lithium ion, and thereby the charge/discharge cycle characteristics may be prevented from degrading.

On the other hand, if the average interplanar spacing d002 is 3.9 Å or smaller, and particularly 3.8 Å or smaller, lithium ion may intercalate or de-intercalate smoothly, and thereby the charge/discharge efficiency may be prevented from degrading.

In addition, the carbon material of the present invention preferably has a crystallite size Lc in the c-axis direction of 8 Å or larger, and 50 Å or smaller.

By adjusting Lc to 8 Å or larger, and particularly 9 Å or larger, a sufficient size of interplanar space of carbon allowing lithium ion to smoothly intercalate or de-intercalate may be formed, and thereby a sufficient level of charge/discharged capacity may be obtained. By adjusting Lc to 50 Å or smaller, and particularly 15 Å or smaller, decay of laminar structure of carbon due to intercalation and de-intercalation of lithium ion, or reductive decomposition of the electrolytic solution may be suppressed, and thereby the charge/discharge efficiency and charge/discharge cycle characteristics may be suppressed from degrading.

Lc may be calculated as follows.

Lc was determined based on the half-value width and diffraction angle of (002) plane peak in a spectrum observed by X ray diffractometry, using Scherrer's equation.

$$Lc = 0.94\lambda/(\beta \cos \theta) \text{ (Scherrer's equation)}$$

Lc: size of crystallite;
$\lambda$: wavelength of characteristic X ray $K_{\alpha 1}$ emitted from negative electrode;
$\beta$: half value width of peak (radian); and
$\theta$: angle of spectral reflection.

X ray diffraction spectrum of the carbon material of the present invention was obtained by using an X-ray diffractometer "XRD-7000", from Shimadzu Corporation. A method of measuring the average interplanar spacing of the carbon material of the present invention is as follows.

Based on a spectrum obtained by X-ray diffractometry of the carbon material of the present invention, average interplanar spacing d (nm) was calculated using Bragg's equation.

$$\lambda = 2d_{hkl} \sin \theta \text{ (Bragg's equation) } (d_{hkl} = d_{002})$$

$\lambda$: wavelength of characteristic X ray $K_{\alpha 1}$ emitted from negative electrode; and
$\theta$: angle of spectral reflection The carbon material of the present invention preferably has a specific surface area, measured by the three-point BET method based on nitrogen adsorption, of 15 $m^2/g$ or smaller and 1 $m^2/g$ or larger.

By adjusting the specific surface area, measured by the three-point BET method based on nitrogen adsorption, to 15 $m^2/g$ or smaller, reaction between the carbon material and the electrolytic solution may be suppressed.

Also by adjusting the specific surface area, measured by the three-point BET method based on nitrogen adsorption, to 1 $m^2/g$ or larger, an appropriate level of permeability of the electrolytic solution into the carbon material may be obtained.

Method of calculating the specific surface area is as follows.

Monolayer adsorption Wm was calculated using equation (1) below, total surface area Stotal was calculated using equation (2) below, and specific surface area S was determined using equation (3) below.

$$1/[W(Po/P-1) = (C-1)/WmC(P/Po)/WmC \tag{1}$$

In equation (1), P: pressure of adsorbate gas under adsorption equilibrium, Po: saturated vapor pressure of adsorbate at adsorption temperature, W: amount of adsorption under adsorption equilibrium pressure P, Wm: amount of monolayer adsorption, C: constant regarding magnitude of interaction between solid surface and adsorbate (C=exp {(E1−E2) RT}) [E1: heat of adsorption of the first layer (kJ/mol), E2: liquefaction heat of adsorbate at measurement temperature (kJ/mol)]

$$S\text{total} = (WmNAcs)M \tag{2}$$

In equation (2), N: Avogadro number, M: molecular weight, and Acs: adsorption cross section $$S = S\text{total}/w \tag{3}$$

In equation (3), w: weight of sample (g).

The above-described carbon material may be manufactured as described in the next.

First, a resin or a resin composition to be carburized is manufactured.

Apparatus for preparing the resin composition is not specifically limited. For mixing under fusion, a kneader such as kneading roll, and single-screw or twin-screw kneader is adoptable. Mixing under dissolution may be proceeded using a mixer such as Henschel mixer, disperser or the like. Mixing by crushing may be proceeded using an apparatus such as hammer mill, jet mill or the like.

The thus-obtained resin composition may be a mixture obtained simply by mixing, in a physical manner, several species of components, or may be a product obtained by allowing a part of them to chemically react with the aid of mechanical energy and heat energy converted therefrom, possibly applied in the process of preparation and mixing (mixing, kneading and so forth). More specifically, mechanochemical reaction with the aid of mechanical energy, and chemical reaction with the aid of heat energy are adoptable.

The carbon material of the present invention is a product obtained by carburization of the above-described resin composition, resin or pitch.

The carburization may be proceeded by elevating temperature from normal temperature at a rate of 1 to 200° C./hour, and keeping the sample at 800 to 3000° C. for 0.1 to 50 hours, and more preferably for 0.5 to 10 hours, although the conditions are not specifically limited. The carburization is preferably proceeded in an inert atmosphere such as composed of nitrogen, helium gas or the like, in a substantially inert atmosphere mainly composed of an inert gas with a trace amount of oxygen, or in a reductive gas atmosphere. In this way, thermal decomposition (oxidative decomposition) of the resin may be suppressed, and thereby a desired carbon material may be obtained.

The above-described conditions including temperature and time of carburization are appropriately adjustable, aiming at optimizing the characteristics of the carbon material.

The carburization may be preceded by pre-carburization.

The pre-carburization may typically be proceeded at 200 to 600° C. for 1 to 10 hours, while conditions thereof are not specifically limited. The resin composition, resin or pitch may be cured by the pre-carburization prior to the carburization, so that even for the case where the carburization is preceded by crushing of the resin composition, resin or pitch, it is now possible to prevent the thus-crushed resin composition, resin or pitch from re-fusing in the process of carburization, and thereby a desired carbon material may be obtained in an efficient manner.

One exemplary method of obtaining the carbon material having a positron lifetime, measured by positron annihilation spectroscopy, of 370 picoseconds or longer and 480 picoseconds or shorter is such as conducting pre-carburization in an atmosphere not containing a reductive gas or inert gas.

For the case where the thermosetting resin or polymerizable polymer compound is used as the resin composing the carbon material, the pre-carburization may further be preceded by curing of the resin composition or resin.

The curing may be proceeded, for example, by a method of inputting heat energy necessary for the curing reaction to the resin composition so as to thermally cure it, or by a method of using the resin together with a curing agent, although not specifically limited thereto. Since the pre-carburization herein may be proceeded substantially in a solid phase, so that the carburization or pre-carburization may be proceeded while keeping the resin structure to a certain degree, and thereby the structure and characteristics of the carbon material become controllable.

In the carburization or pre-carburization, the resin composition may be added with metal, pigment, lubricant, antistatic agent, antioxidant and so forth, so as to impart desired characteristics to the carbon material.

For the case where the curing and/or pre-carburization were adopted, the resultant product may be crushed prior to the succeeding carburization. In this case, variation in thermal history during the carburization may be suppressed, thereby uniformity in the surface state of the carbon material may be improved, and handleability of the resultant product may be improved.

For the purpose of obtaining the carbon material having a positron lifetime of 370 picoseconds or longer and 480 picoseconds or shorter, when measured by the positron annihilation spectroscopy, the carburized product may typically be allowed to naturally cool in a oven from 800 to 500° C., under the presence of a reductive gas or inert gas, and then may be allowed to rapidly cool at a rate of 20 to 500° C./hour down to 200° C. or below, preferably down to 100° C. or below, while purging the reductive gas or inert gas. The natural cooling in the oven is proceeded at a rate of smaller than 20° C./hour.

In this way, the carbon material may be suppressed from cracking, and the voids formed therein may be maintained. It is therefore supposed that the carbon material having a positron lifetime of 370 picoseconds or longer and 480 picoseconds or shorter, when measured by the positron annihilation spectroscopy, may be obtained in a good yield.

(Lithium Secondary Cell)

Next, embodiments of the negative electrode material for secondary cell of the present invention (simply referred to as "negative electrode material", hereinafter) and embodiments of lithium secondary cell using the same (simply referred to as "secondary cell", hereinafter) will be explained.

Figure 2:
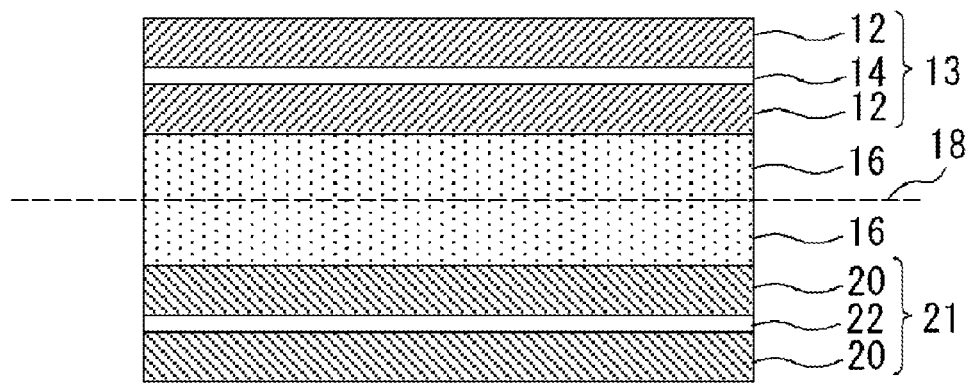
FIG. 2 is a schematic drawing illustrating a lithium ion secondary cell.

FIG. 2 is a schematic drawing illustrating a configuration of one embodiment of the secondary cell.

A secondary cell 10 contains a negative electrode 13 which is configured by a negative electrode material 12 and a negative electrode current collector 14; a positive electrode 21 which is configured by a positive electrode material 20 and a positive electrode current collector 22; an electrolytic solution 16; and a separator 18.

In the negative electrode 13, copper foil or nickel foil is adoptable as the negative electrode current collector 14. As the negative electrode material 12, the above-described carbon material for lithium ion secondary cell of the present invention is used.

The negative electrode material of the present invention is manufactured typically as described below.

The negative electrode material 12 may be obtained by mixing 100 parts by weight of the carbon material, 1 to 30 parts by weight of an organopolymer binder (such as fluorine-containing polymer including polyethylene and polypropylene; rubber-like polymer such as butyl rubber, butadiene rubber and styrene butadiene rubber; and water-soluble polymer such as carboxymethyl cellulose), and an appropriate amount of a solvent for adjusting viscosity (N-methyl-2-pyrrolidone, dimethylformamide, etc.), kneading the mixture, and then molding the resultant paste-like mixture into sheet, pellet or the like, typically by compression molding or roll molding.

The negative electrode 13 may be manufactured by stacking the negative electrode material 12 and the negative electrode current collector 14.

The negative electrode 13 may be manufactured, alternatively by mixing 100 parts by weight of the carbon material, 1 to 30 parts by weight of an organopolymer binder (such as fluorine-containing polymer including polyethylene, polypropylene and so forth; and rubber-like polymer such as butyl rubber, butadiene rubber and so forth), and an appropriate amount of a solvent for adjusting viscosity (N-methyl-2-pyrrolidone, dimethylformamide, etc.), kneading the mixture, and then coating the resultant slurry-like mixture, used as the negative electrode material 12, onto the negative electrode current collector 14, and then molding the resultant article.

The electrolytic solution 16 adoptable herein may be a solution obtained by dissolving a lithium salt as an electrolyte into a nonaqueous solvent.

Examples of the nonaqueous solvent adoptable herein include cyclic ester such as propylene carbonate, ethylene carbonate, and γ-butyrolactone; chain-like ester such as dimethyl carbonate and diethyl carbonate; and chain-like ether such as dimethoxyethane.

Examples of the electrolyte adoptable herein include lithium metal salt such as $LiClO_4$ and $LiPF_6$, and tetraalkyl ammonium salt. Alternatively, these salts may be mixed with polyethylene oxide, polyacrylonitrile or the like, and the mixture may be used as a solid electrolyte.

The separator 18 may be configured typically by using porous film composed of polyethylene, polypropylene or the like, or non-woven fabric, while not specifically limited.

The positive electrode material 20 in the positive electrode 21 may be configured typically by using complex oxide such as lithium cobalt oxide ($LiCoO_2$), lithium nickel oxide ($LiNiO_2$) and lithium manganese oxide ($LiMn_2O_4$); and electroconductive polymer such as polyaniline and polypyrrole, while not specifically limited.

As the positive electrode current collector 22, aluminum foil may be used for example.

The positive electrode 21 of this embodiment may be manufactured according to any publicly-known method of manufacturing a positive electrode.

Note that the present invention is not limited to the above-described embodiments, and embraces all modifications and improvements so long as the objects of the present invention may be achieved.

EXAMPLE

The present invention will be explained below, referring to Examples. Note, however, that the present invention is not limited to Examples. Also note that, in the individual Examples and Comparative Examples, "parts" means "parts by weight", and "%" means "% by weight".

First, methods of measurement in Examples and Comparative Examples will be explained.

(1. Method of Measurement of Positron Lifetime by Positron Annihilation Spectroscopy)

Electromagnetic wave (annihilation γ ray) generated when a positron annihilates was measured using a positron/positronium lifetime and nanopore measuring instrument (from National Institute of Advanced Industrial Science and Technology), and the positron lifetime was determined.

Specific conditions are shown below:

(A) positron radiation source: positron was generated from electron-positron pair, using an electron accelerator owned by Research Institute of Instrumentation Frontier, at the National Institute of Advanced Industrial Science and Technology (the electron accelerator irradiates a target (tantalum) with an electron beam to produce electron-positron pair, and then to produce positron);

(B) γ ray detector: $BaF_2$ scintillator and photoelectron multiplier;

(C) measurement temperature and atmosphere: 25° C., in vacuum ($1 \times 10^{-5}$ Pa ($1 \times 10^{-7}$ Torr));

(D) annihilation γ-ray counts: $\geq 3 \times 10^6$;

(E) positron beam energy: 10 keV; and (F) sample size: the powder coated 0.1 mm thick on a sample holder (aluminum plate).

(2. Average Interplanar Spacing ($d_{002}$), and Size of Crystallite (Lc) in the c-Axis Direction (Lc))

Average interplanar spacing was measured using an X-ray diffractometer "XRD-7000", from Shimadzu Corporation.

Based on a spectrum obtained by X-ray diffractometry of the carbon material, average interplanar spacing $d_{002}$ (nm) was calculated using Bragg's equation.

$$\lambda = 2d_{hkl} \sin \theta \text{ (Bragg's equation) } (d_{hkl}=d_{002})$$

λ: Wavelength of characteristic X ray $K_{\alpha 1}$ emitted from negative electrode θ: Angle of spectral reflection Lc was measured and determined based on the half value width of 002 plane peak and diffraction angle observed in a spectrum obtained by X-ray diffractometry, using Scherrer's equation below.

$$Lc = 0.94\lambda/(\beta \cos \theta) \text{ (Scherrer's equation)}$$

Lc: Size of crystallite

λ: Wavelength of characteristic X ray $K_{\alpha 1}$ emitted from negative electrode β: Half value width of peak (radian)

θ: Angle of spectral reflection (3. Specific Surface Area)

Specific surface area was measured by the three-point BET method based on nitrogen adsorption, using Nova-1200 analyzer from Yuasa Co., Ltd. Specific procedures of calculation are same as those described previously in Embodiment.

(4. Carbon Content, Nitrogen Content)

Carbon content and nitrogen content were measured using an elemental analyzer "PE2400" from PerkinElmer Inc. A sample was converted into $CO_2$, $H_2O$ and $N_2$ by combustion, the gasified sample was homogenized, and allowed to pass through a column. In this way, the individual gases were stepwisely separated, wherein the individual contents of carbon, hydrogen and nitrogen were determined based on the individual values of thermal conductivity.

i) Carbon Content

The obtained carbon material was dried at 110° C. in vacuo for 3 hours, and the carbon content was measured using the elemental analyzer.

ii) Nitrogen Content

The obtained carbon material was dried at 110° C. in vacuo for 3 hours, and the nitrogen content was measured using the elemental analyzer.

(5. Charging Capacity, Discharged Capacity, Charge/Discharge Efficiency)

(1) Manufacturing of Two-Electrode Coin Cell for Evaluating Secondary Cell

One hundred parts of the carbon material obtained in the individual Examples and Comparative Examples was added with 10 parts of poly(vinylidene fluoride) as a binder, and an appropriate amount of N-methyl-2-pyrrolidone as a diluting solvent, to thereby prepare a slurry-like negative electrode mixture. The slurry-like negative electrode mixture thus prepared was coated on both surfaces of a 18 μm-thick copper foil, and dried at 110° C. in vacuo for one hour. After drying in vacuo, the electrode was molded under pressure using a roll press. The pressed article was cut into a 16.156 mm diameter circle, thereby the negative electrode was manufactured.

A two-electrode coin cell for evaluation was configured using lithium metal as the positive electrode. An electrolytic solution used herein was obtained by dissolving lithium perchlorate into an 1:1 (by volume) mixed solution of ethylene carbonate and diethyl carbonate so as to adjust the concentration to 1 mol/L.

(2) Evaluation of Charging Capacity and Discharged Capacity

The cell was charged using a constant current of 25 mA/g up to 1 mV, and the charging was terminated when the current decreased to 1.25 mA/g under a constant voltage of 1 mV. Cutoff potential of discharging was set to 1.5 V.

(3) Evaluation of Charge/Discharge Efficiency

Charge/discharge efficiency was calculated using a value obtained in (2) in the above, according to the equation below:

Charge/discharge efficiency (%)=[discharged capacity/charging capacity]×100

(4) Evaluation of Cycle Characteristic

A discharged capacity, observed after measurement repeated 200 times under the conditions for evaluating the initial charge/discharge characteristics, was adopted as the discharged capacity at the 200-th cycle. The cycle characteristic (in %, capacity retention at the 200-th cycle) was defined according to the equation below:

Cycle characteristic (in %, capacity retention at the 200-th cycle)=[discharged capacity (mAh/g) at the 200-th cycle/initial discharged capacity (mAh/g)]×100

Example 1

Phenol resin PR-217 (from Sumitomo Bakelite Co. Ltd.), used as the resin composition, was treated in the processes (a) to (f) below, to thereby obtain a carbon material.

(a) heating from room temperature up to 500° C. at a rate of 100° C./h, under none of reductive gas replacement, inert gas replacement, reductive gas flow, and inert gas flow;

(b) degreasing at 500° C. for 2 hours, under none of reductive gas replacement, inert gas replacement, reductive gas flow, and inert gas flow, followed by cooling;

(c) pulverizing in a vibrating ball mill;

(d) heating from room temperature up to 1200° C. at a rate of 100° C./h, under inert gas (nitrogen) replacement and flow;

(e) carbonizing at 1200° C. for 8 hours under inert gas (nitrogen) flow; and (f) natural cooling down to 600° C. under inert gas (nitrogen) flow, and cooling from 600° C. down to 100° C. or below at a rate of 100° C./h.

Example 2

Aniline resin (synthesized as described below) was used in place of the phenol resin used in Example 1.

One hundred parts of aniline, 697 parts of a 37% aqueous formaldehyde solution, and 2 parts of oxalic acid were input in a three-necked flask equipped with a stirrer and a condenser, the mixture was allowed to react at 100° C. for 3 hours, then dewatered, to thereby obtain 110 parts of aniline resin. The thus obtained aniline resin was found to have a weight-average molecular weight of approximately 800.

One hundred parts of the aniline resin obtained in the above and 10 parts of hexamethylenetetramine were mixed by crushing, and the obtained resin composition was processed similarly as described in Example 1, to thereby obtain a carbon material.

Example 3

The resin composition same as that in Example 2 was used.

A carbon material was obtained similarly as described in Example 2, except that the processes (d) and (e) for processing the resin composition were modified as described below.

(d) heating from room temperature up to 1100° C., at a rate of 100° C./h, under inert gas (nitrogen) replacement and flow; and (e) carbonizing at 1100° C. for 8 hours, under inert gas (nitrogen) flow.

Example 4

A carbon material was obtained by the processes similar to those in Example 3, except that TGP1000 (from Osaka Kasei Co., Ltd.) was used as the resin composition.

Comparative Example 1

A carbon material composed of graphite (mesophase carbon microbeads) was prepared.

Comparative Example 2

Thirty parts of novolac-type phenol resin (PR-53195, from Sumitomo Bakelite Co., Ltd.), 3 parts of hexamethylenetetramine, and 70 parts of melamine resin were mixed by crushing, to thereby prepare a resin composition.

The obtained resin composition was processed as described below, to thereby obtain a carbon material. Process (t) was followed by natural cooling.

(a) Heating from 100° C. up to 200° C. at a rate of 20° C./h, under none of reductive gas replacement, inert gas replacement, reductive gas flow, and inert gas flow;

(b) heating at 200° C. for one hour, under none of reductive gas replacement, inert gas replacement, reductive gas flow, and inert gas flow;

(c) pulverizing in a vibrating ball mill;

(h) heating from room temperature up to 1200° C. at a rate of 10° C./h under a nitrogen atmosphere; and (t) carbonizing at 1200° C. for 10 hours under a nitrogen atmosphere.

Comparative Example 3

In a three-necked flask equipped with a stirrer and a condenser, 135 parts by weight of anthraquinol, 40 parts by weight of a 37% aqueous formaldehyde solution, 2 parts by weight of a 25% aqueous sulfuric acid solution, and 150 parts by weight of methyl isobutyl ketone were input, the mixture was allowed to react at 100° C. for 3 hours, the reaction temperature was elevated up to 150° C., and the mixture was dewatered, to thereby obtain 90 parts by weight of polycyclic phenol resin.

One hundred parts by weight of the thus-obtained polycyclic phenol resin was added with 10 parts by weight of hexamethylenetetramine, the mixture was mixed by crushing, and allowed to cure at 200° C. for 5 hours, under none of reductive gas replacement, inert gas replacement, reductive gas flow, and inert gas flow. After the curing, the product was heated under a nitrogen atmosphere up to 1000° C., carburized for 10 hours, then naturally allowed to cool, to thereby obtain a carbon material.

The carbon material obtained in the above-described Examples and Comparative Examples were subjected to measurement of positron lifetime, average interplanar spacing, crystallite size, specific surface area, carbon content, and nitrogen content. Results are shown in Table 1.

Also the charging capacity, discharged capacity, and charge/discharge efficiency of cells, configured by using the carbon materials obtained in the above-described Examples and Comparative Examples as the negative electrodes, were measured. Results are shown in Table 2.

TABLE 1

| | Positron lifetime (ps) | $d_{002}$ (Å) | Lc (Å) | Specific surface area (m²/g) | Carbon content (wt %) | Nitrogen content (wt %) |
|---|---|---|---|---|---|---|
| Example 1 | 408 | 3.78 | 9.99 | 7 | 97.5 | 0.9 |
| Example 2 | 446 | 3.64 | 11.4 | 6 | 96.5 | 1.6 |
| Example 3 | 404 | 3.66 | 10.7 | 5 | 95.0 | 2.9 |
| Example 4 | 385 | 3.75 | 11.0 | 5 | 96.9 | 0.8 |

TABLE 1-continued

|  | Positron lifetime (ps) | $d_{002}$ (Å) | Lc (Å) | Specific surface area (m²/g) | Carbon content (wt %) | Nitrogen content (wt %) |
|---|---|---|---|---|---|---|
| Comparative Example 1 | 357 | 3.37 | 110 | 3 | 98.8 | 0.0 |
| Comparative Example 2 | 524 | 3.81 | 10.0 | 12 | 90.1 | 8.8 |
| Comparative Example 3 | 362 | 3.72 | 12.0 | 4 | 99.5 | 0.3 |

TABLE 2

|  | Charging capacity (mAh/g) | Discharged capacity (mAh/g) | Charge/discharge efficiency (%) |
|---|---|---|---|
| Example 1 | 483 | 377 | 78 |
| Example 2 | 460 | 390 | 85 |
| Example 3 | 538 | 436 | 81 |
| Example 4 | 464 | 380 | 82 |
| Comparative Example 1 | 290 | 276 | 94 |
| Comparative Example 2 | 615 | 352 | 57 |
| Comparative Example 3 | 335 | 295 | 88 |

Examples 1 to 4, characterized by values of positron lifetime of 370 picoseconds or longer and 480 picoseconds or shorter, when measured by the positron annihilation spectroscopy, were found to have very large charging capacity and discharged capacity, and have values of charge/discharge efficiency of as high as 75% or higher.

Examples 2 and 3, characterized not only by values of positron lifetime of 370 picoseconds or longer and 480 picoseconds or shorter, but also by nitrogen contents of 1 wt % or more and 5 wt % or less, were found to show large discharged capacity.

Examples 2 and 3 are supposed to have formed therein pores of effective size, which allow reversible intercalation and de-intercalation of lithium ion, as judged from values of the average interplanar spacing d of the (002) planes, observed by wide angle X-ray diffractometry and calculated using Bragg's equation, of 3.4 Å or larger and 3.9 Å or smaller, and from values of the positron lifetime of 370 picoseconds or longer and 480 picoseconds or shorter, and are also supposed to give desirable electrical characteristics to the carbon material, by virtue of eletronegativity ascribable to the nitrogen content of the carbon material, optimized at 1 wt % or more and 5 wt % or less. This supposedly promotes intercalation and de-intercalation of lithium ion, enough to obtain excellent charge/discharge characteristics.

In contrast, Comparative Example 1 was found to show low values in both of the charging capacity and discharged capacity. Comparative Example 2 was found to show a positron lifetime as very large as 524 picoseconds, and a very small charge/discharge efficiency.

Comparative Example 1 also showed a charge/discharged capacity of the carbon material after 200 cycles of 75.8% of the initial charge/discharged capacity. In contrast, the charge/discharged capacity of the carbon material of Example 1 was found to be kept at 99.3% of the initial charge/discharged capacity. As is understood from the above, the carbon material for lithium ion secondary cell of the present invention was found to show cycle characteristics much better than those shown by graphite.

This is supposedly because the carbon material of the present invention has an average interplanar spacing d of the (002) planes, observed by wide angle X-ray diffractometry and calculated using Bragg's equation, of 3.4 Å or larger, and 3.9 Å or smaller, and has a positron lifetime of 370 picoseconds or longer and 480 picoseconds or shorter, so that expansion and shrinkage of the grains in the process of intercalation and de-intercalation of lithium ion may be suppressed, and thereby the electric conductivity of the current collector and the carbon material may be retained at excellent levels.

Comparative Example 3 was found to show a positron lifetime as very small as 362 picoseconds, and a very small values both in the charging capacity and the discharged capacity.

This application claims priority right based on Japanese Patent Application No. 2009-267807 filed on Nov. 25, 2009, the entire content of which is incorporated hereinto by reference.

The present application includes the inventions below.

(a) A carbon material for lithium ion secondary cell having a positron lifetime of 370 picoseconds or longer and 480 picoseconds or shorter, when measured by positron annihilation spectroscopy under conditions (A) to (E) below:

(A) positron radiation source: positrons generated from electron-positron pairs using an electron accelerator;

(B) gamma ray detector: a $BaF_2$ scintillator and a photoelectron multiplier;

(C) measurement temperature and atmosphere: 25° C., in vacuum;

(D) annihilation γ-ray counts: $3\times10^6$ or larger; and (E) positron beam energy: 10 keV.

(b) The carbon material for lithium ion secondary cell according to (a), having an average interplanar spacing d of the (002) planes, observed by wide angle X-ray diffractometry and calculated using Bragg's equation, of 3.4 Å or larger, and 3.9 Å or smaller, and having a crystallite size Lc in the c-axis direction of 8 Å or larger, and 50 Å or smaller.

(c) The carbon material for lithium ion secondary cell according to (a) or (b), having a specific surface area, measured by the three-point BET method based on nitrogen adsorption, of 15 m²/g or smaller, and 1 m²/g or larger.

(d) The carbon material for lithium ion secondary cell according to any one of (a) to (c), containing 95 wt % or more of carbon atom, and 0.5 wt % or more and 5 wt % or less of nitrogen atom as an element other than carbon atom.

(e) A negative electrode material for lithium ion secondary cell, containing the carbon material for lithium ion secondary cell described in any one of (a) to (d).

(f) A lithium ion secondary cell, containing the negative electrode material for lithium ion secondary cell described in (e).

The invention claimed is:

1. A lithium ion secondary cell, comprising:
a negative electrode which is configured by a negative electrode material and a negative electrode current collector,
a positive electrode which is configured by a positive electrode material and a positive electrode current collector, an electrolytic solution obtained by dissolving a lithium salt into a nonaqueous solvent, and a separator,
wherein the negative electrode material contains a carbon material having a positron lifetime of 370 picoseconds or longer and 480 picoseconds or shorter, when measured by positron annihilation spectroscopy under conditions (A) to (E) below:
(A) positron radiation source: positrons generated from electron-positron pairs using an electron accelerator;
(B) gamma ray detector: a BaF2 scintillator and a photoelectron multiplier;
(C) measurement temperature and atmosphere: 25° C., in vacuum;
(D) annihilation y-ray counts: 3×106 or larger; and
(E) positron beam energy: 10 keV,
wherein said carbon material containing 96.5 wt % or more of carbon atom, and 0.5 wt % or more and 3.5 wt % or less of nitrogen atom as an element other than carbon atom and,
said carbon material is in the form of a grain.

2. The lithium ion secondary cell according to claim 1,
wherein said carbon material has an average interplanar spacing d of the (002) planes, observed by wide angle X-ray diffractometry and calculated using Bragg's equation, of 3.4 Å or larger, and 3.9 Å or smaller.

3. The lithium ion secondary cell according to claim 1,
wherein said carbon material has a crystallite size Lc in the c-axis direction of 8 Å or larger, and 50 Å or smaller.

4. The lithium ion secondary cell according to claim 1,
wherein said carbon material has a specific surface area, measured by the three-point BET method based on nitrogen adsorption, of 15 $m^2$/g or smaller, and 1 $m^2$/g or larger.

5. The lithium ion secondary cell according to claim 1,
wherein when an initial discharged capacity is $X_1$, and a discharged capacity, observed after measurement repeated 200 times under the conditions for evaluating an initial charge/discharge characteristics, is $X_2$, cycle characteristic defined as $X_2/X_1*100$ is equal to or greater than 99.3%.

* * * * *